United States Patent

Muratorio

[15] 3,674,830
[45] July 4, 1972

[54] PRODUCTION OF ALPHA-NAPHTHYL METHANESULFONATE ESTERS

[72] Inventor: Jorge R. Muratorio, Buenos Aires, Argentina

[73] Assignee: Celanese Corporation, New York, N.Y.

[22] Filed: Sept. 24, 1969

[21] Appl. No.: 860,838

[52] U.S. Cl. .................................. 260/456 P, 260/618 F
[51] Int. Cl. .......................................... C07c 143/68
[58] Field of Search ........................... 260/456 R, 456 P

[56] References Cited

UNITED STATES PATENTS 3,320,301   5/1967   MacLean ........................... 260/456 P

OTHER PUBLICATIONS

Morrison and Boyd, " Organic Chemistry" pp. 509, 812 to 814, (1959) (Allyn and Bacon, Inc.)

Suter, " The Organic Chem. of Sulfur," pp. 268– 272 (1944, Wiley)

Hatch, " Chemistry of Naphthalenes," Hydrocarbon Processing and Petroleum Refinery, Vol. 42, (3) 113– 118 (1963)

Primary Examiner—Leon Zitver
Assistant Examiner—L. B. De Crescente
Attorney—D. J. De Witt, M. Turken and K. W. Vernon

[57] ABSTRACT

Disclosed herein is a method of preparing alpha-naphthyl esters by the oxidation of naphthalene with bis-(methanesulfonyl peroxide). High ratios of the alpha to the beta-ester are prepared at high efficiencies and at reasonable temperatures by selecting certain solvents and by controlling certain other reaction variables. The alpha-naphthyl esters can be easily converted to alpha-naphthol.

2 Claims, No Drawings

PRODUCTION OF ALPHA-NAPHTHYL METHANESULFONATE ESTERS

This application is a continuation of U.S. application Ser. No. 566,239, filed July 19, 1966, now abandoned. This invention relates broadly to the production of predominantly alpha-naphthyl esters. More particularly this invention is concerned with the preparation of predominantly alpha-naphthyl esters and alpha-naphthol by the oxidation of naphthalene with bis-(methanesulfonyl peroxide).

The sulfonation of naphthalene is known and has been studied extensively for quite a number of years. For example, alpha-naphthalene sulfonic acid has been prepared by the sulfonation of naphthalene using concentrated sulfuric acid and chlorosulfonic acid. Commercially it has been prepared by sulfonating naphthalene with about 98 percent sulfuric acid using seed crystals of alpha-naphthalene sulfonic acid.

The process as herein described constitutes an efficient cyclic process for the production of predominantly alpha-naphthylmethanesulfonate which can be readily hydrolyzed to alpha-naphthol, a valuable intermediate in the production of certain insecticides.

Prior to this invention it was known that aromatic compounds could be oxidized with bis-(lower alkane sulfonyl peroxides) such as bis-(methane-sulfonyl peroxide), with the formation of aromatic esters. Such a process is described, for example, in U.S. Pat. No. 3,320,301 filed Sept. 18, 1963, assigned to the assignee of the present application.

It has been unexpectedly found that naphthalene can be oxidized with bis-(methanesulfonyl peroxide) to form naphthyl esters with the ratio of the alpha- to the beta-ester being at least about 8. This was totally unexpected as it would be thermodynamically expected that a predominant amount of the $\beta$-ester would be formed.

It is an object of this invention to produce predominant amounts of alpha-naphthyl esters at high efficiencies and at reasonable temperatures.

It is a further object of this invention to continuously produce alpha-naphthol from naphthalene by oxidizing naphthalene with bis-(methanesulfonyl peroxide) to the naphthyl ester and hydrolyzing the ester to the corresponding naphthol.

Specifically, this invention comprises oxidizing naphthalene with bis-(methanesulfonyl peroxide) in the presence of a solvent for both naphthalene and bis-(methanesulfonyl peroxide) under the conditions of the reaction and which is chemically inert with respect to methanesulfonyl peroxide or which is substantially inert to methanesulfonyl peroxide with respect to naphthalene.

Alpha-naphthyl methanesulfonate, formed by the process of this invention, can be hydrolyzed under acidic or alkaline conditions to alpha-naphthol which is a valuable intermediate useful in production of certain insecticides. The process of this invention can be illustrated by the following equations below:

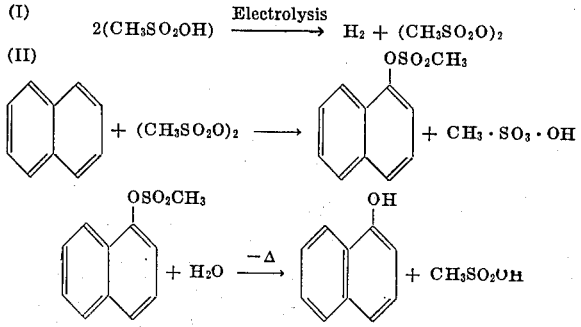

Bis-(methanesulfonyl peroxide) can be prepared by any number of methods; however, for purposes of this invention the preparation of bis-(methanesulfonyl peroxide) by electrolysis is very effective. As shown in the above equation the methanesulfonic acid resulting from the oxidation of naphthalene to the naphthyl ester can be recycled to regenerate the peroxide or, as was mentioned before, the ester can be hydrolyzed to yield predominantly alpha-naphthol and methanesulfonic acid, the latter of which can also be recycled to regenerate the peroxide.

In general, the method of the present invention provides a high yield of the desired alpha-ester. For example, yields of alpha-ester of 60 to 90 percent based on bis-(methanesulfonyl peroxide) have been obtained by this process.

The method of this invention is carried out in a reaction medium in which both naphthalene and bis-(methanesulfonyl peroxide) are soluble at least to a limited extent. Both naphthalene and bis-(methanesulfonyl peroxide) are solids; hence, it is necessary to use a solvent in order for the reaction to be carried out at reasonable temperatures. If a reactive solvent is used, such as benzene, it must have a reaction rate with bis-(methanesulfonyl peroxide) at least 10 times less than that of naphthalene. Suitable inert solvents which have been found useful in the process of this invention include nitrobenzene. Other solvents which may be used include such compounds as dioxane, acetone, acetic acid, benzene, toluene, etc.

The process of this invention can be carried out continuously, semi-continuously or by a batchwise process. Preferably a continuous process is used, especially where the production of predominant amounts of alpha-naphthol are desired.

The temperature has a significant effect on the reaction rate of naphthalene to the desired naphthyl ester. The reaction can be conducted at temperatures ranging from 0° C. to about 50° C. More desirably, the reaction is conducted at ambient temperatures ranging from about 15° to 40° C. At temperatures above 50° C. there is danger of explosion because of the very high reaction rate of the bis-(methanesulfonyl peroxide) with the reactants. Atmospheric, sub-atmospheric or super-atmospheric pressures may be employed, the pressure having no significant effect on the reaction. Pressures may range, for example, anywhere from 0 to 1,000 psig. The molar ratio of naphthalene to bis-(methanesulfonyl peroxide) is usually 1:1 but it may range from 0.5:1 to 10:1. The concentration of bis-(methanesulfonyl peroxide) used may constitute as little as 0.01 mole per liter of the total amount of the reaction mixture (naphthalene, peroxide and solvent). More may be used, however, the use of larger amounts does not result in any particular advantage. For a batch process the amount of bis-(methanesulfonyl peroxide) generally ranges from about 0.05 to 0.2 mole per liter. The concentration of naphthalene ranges from about 0.01 to 0.6 moles per liter.

By the process of the instant invention molar ratios of the alpha to the beta naphthyl esters of at least 8 can be obtained at efficiencies ranging from 40 to 95 percent.

EXAMPLE I

Bis-(methanesulfonyl peroxide) was made by the anodic oxidation of 10 M aqueous methanesulfonic acid. A cylindrical container three cm. in diameter and 7 cm. deep, cooled by a cold water jacket was used as an electrolytic cell. The anode, a platinum wire, was rotated to provide good mixing and to keep precipitated bis-(methanesulfonyl peroxide) in suspension. The electrolyte was recirculated in the cell with the aid of a bellows pump. The suspended peroxide was filtered from the electrolyte with a fritted glass filter. The cathode and the anode were both 0.1 mm. platinum wires, the cathode being 18 cm. long and the anode 64 cm long. About 120 ml. of a 10 M solution of methanesulfonic acid was fed to the electrolytic cell and the recirculating system. For each batch of bis-(methanesulfonyl peroxide) prepared, 1.0 amps, was passed through the cell for 3 hours at a current density of 0.5 amps/sq. cm. The peroxide separated in the filter was washed with cold water and dried at room temperature in a vacuum oven for over 24 hours.

Using the bis-(methanesulfonyl peroxide) prepared as described above, runs were carried out at atmospheric pressures and at room temperature (23° C) using various media as solvents for naphthalene and bis-(methanesulfonyl peroxide). Typically the naphthalene was dissolved in the medium separately from the dissolution of the bis-(methanesulfonyl peroxide). After dissolution of both reactants they were immediately mixed. Some reaction between bis-(methanesulfonyl peroxide) and the solvent was observed when acetone and dioxane was used. For example, in a solution of 0.4 M bis-(methanesulfonyl peroxide) in dioxane at room temperature, 50 percent of the peroxide reacted with the dioxane in the first ten minutes while under the same conditions, only 3 percent of the peroxide reacted when acetone was used as the solvent. No reaction with the peroxide was observed when nitrobenzene was used as solvent. These results are shown in Table I below.

2. Using nitrobenzene as the solvent and stoichiometric amounts of the reactants the efficiency based on bis-(methanesulfonyl peroxide) varied from between 60 and 73 percent for the alpha-ester and between 2 and 8 percent for the beta-ester. When naphthalene was used in 100 mole percent excess (run no. 6) with acetone as the solvent, the efficiencies to the total esters based on naphthalene were practically quantitative. Under the same conditions the yields based on bis-(methanesulfonyl peroxide) were 71 and 68.5 for the alpha-ester and 6 and 5 percent for the beta-ester.

TABLE I

| Run No. | Solvent | Reaction of MSP with the Solvent | | | Reaction of MSP with naphthalene and solvent | | | | α-ester formed, g. | β-ester formed, g. | Ratio of α- to β-ester |
|---|---|---|---|---|---|---|---|---|---|---|---|
| | | Initial conc. | Time, min. | MSP, weight percent | Conc. of reactants | Total vol. of reaction mixture, ml. | Time, min. | MSP, weight percent | | | |
| 1 | Dioxane | 0.4 M | 0 | 5.1 | 0.2 M | 20 | 0 | 1.66 | | | |
| | | | 15 | 1.9 | | | 20 | 0.04 | 0.400 | 0.025 | 16.0 |
| | | | 20 | | | | | | 0.468 | 0.036 | 13.0 |
| | | | 40 | <0.04 | | | | | 0.500 | 0.038 | 13.1 |
| 2 | Nitrobenzene | 0.4 M | 3 | 6.9 | 0.2 M | 20 | 3 | 1.42 | 0.440 | 0.040 | 11.0 |
| | | | 22 | 6.9 | | | 22 | <0.02 | 0.474 | 0.046 | 10.3 |
| 3 | Acetone | 0.2 M | 0 | 2.88 | 0.1 M | 20 | 0 | 1.0 | | | |
| | | | 30 | 2.66 | | | 30 | 0.2 | 0.164 | 0.013 | 12.6 |
| | | | 60 | 2.43 | | | 60 | 0.04 | 0.170 | 0.017 | 10.0 |
| | | | 120 | 2.19 | | | 120 | <0.04 | | | |
| | | | 180 | 2.05 | | | 180 | | | | |
| 4 | Acetone | 0.4 M | 0 | 6.7 | 0.2 M | 20 | 1 | 2.4 | 0.372 | 0.032 | 11.6 |
| | | | 1 | | | | 25 | 0.2 | 0.418 | 0.032 | 13.0 |
| | | | 25 | 6.4 | | | 45 | <0.04 | | | |
| | | | 45 | 5.9 | | | | | | | |

The runs were carried out at atmospheric pressure and room temperature. The abbreviations used in this table are: MSP, methanesulfonyl peroxide; α-ester, α-naphthyl methanesulfonate; β-ester, β-naphthyl methanesulfonate.

The solution of methanesulfonyl peroxide in the solvent was divided into two portions. Immediately, naphthalene dissolved in an equal volume of solvent was added to one and then the decrease in peroxide content with time was followed. The MSP used in these runs were 80 to 95% pure.

TABLE II

| Run number | 1 | 2 | 3 | 4 | 5 | 6 |
|---|---|---|---|---|---|---|
| Solvent | Acetone | Acetone | Nitrobenzene | Nitrobenzene | Acetone | Acetone |
| Naphthalene: | | | | | | |
| g | 0.125 | 0.261 | 0.133 | 0.260 | 0.274 | 0.254 |
| mmol | 0.98 | 2.04 | 1.04 | 2.03 | 2.14 | 1.99 |
| mol./liter | 0.098 | 0.204 | 0.104 | 0.203 | 0.214 | 0.199 |
| MSP: | | | | | | |
| g | 0.200 | 0.392 | 0.190 | 0.380 | 0.203 | 0.190 |
| mmol | 1.05 | 2.07 | 1.00 | 2.00 | 1.13 | 1.00 |
| mol./liter | 0.105 | 0.207 | 0.100 | 0.200 | 0.113 | 0.100 |
| Naphthalene after reaction, g | 0.035 | 0.075 | | | 0.180 | 0.160 |
| α-Ester formed: | | | | | | |
| weight g | 0.125 | 0.280 | 0.163 | 0.268 | 0.156 | 0.152 |
| mmoles | 0.56 | 1.26 | 0.73 | 1.20 | 0.70 | 0.68 |
| α-+β-Ester formed: | | | | | | |
| weight g | 0.145 | 0.300 | 0.180 | 0.278 | 0.170 | 0.165 |
| mmoles | 0.65 | 1.35 | 0.81 | 1.25 | 0.77 | 0.74 |
| Conv. of naphthalene, mole percent | 72.0 | 71.5 | | | | |
| Efficiency, to α-ester based on naphthalene, mole percent | 80.0 | 78.0 | | | 95.6 | 93.3 |
| Efficiency, to α-+β-ester based on naphthalene, mole percent | 93.0 | 81.0 | | | 104 | 101 |
| Yield of α-ester based on MSP, mole percent | | | 73.5 | 60.5 | 71.0 | 68.5 |
| Yield of β-ester based on MSP, mole percent | | | 7.7 | 1.7 | 6.3 | 5.8 |
| Yield of α-+β-ester based on MSP, mole percent | | | 81.2 | 62.2 | 77.3 | 74.3 |

The runs were carried out at atmospheric pressure and room temperature. The abbreviations used in this table are: MSP, bis-(methanesulfonyl peroxide); α-ester, α-naphthyl methanesulfonate; β-ester, β-naphthyl methanesulfonate. The total volume of the reaction mixture was 10 ml.

The ratio between the alpha- and beta- methanesulfonates in the various reaction media shown in the Table I above indicate that the alpha ester forms in preference to the beta ester such that the mole ratio of the alpha- to the beta- ester is greater than 10.

Table II indicates that when the reaction between naphthalene and bis-(methanesulfonyl peroxide) is carried out using acetone as the solvent and approximately equimolar amounts of reactants (0.1 M and 0.2 M), the efficiency of conversion to beta-naphthyl methanesulfonate ranged from 3 to 13 mole percent based on naphthalene while the efficiency of conversion to the alpha-ester under these conditions was approximately 80 mole percent. This is indicated by runs 1 and

EXAMPLE II

Acetic acid was tested as a solvent for the naphthalene and bis-(methanesulfonyl peroxide) reactants. Reaction between bis-(methanesulfonyl peroxide) and acetic acid was observed; however, the reaction with naphthalene proceeded at a much higher rate such that acetic acid could be used as a solvent. For example, in a solution of 0.37 M bis-(methanesulfonyl peroxide) in acetic acid at room temperature, less than 1 percent of the peroxide reacted with the solvent in the first 10 minutes. Table III below shows the reaction of naphthalene with bis-(methanesulfonyl peroxide) at atmospheric pressure and at room temperature using acetic acid as solvent.

TABLE III

| Run number | 1 | 2 | 3 | 4 | 5 | 6 | 7 | 8 | 9 | 10 | 11 | 12 | 13 |
|---|---|---|---|---|---|---|---|---|---|---|---|---|---|
| Solvent | AcOH | AcOH | AcOH | AcOH | AcOH | AcOH | AcOH | AcOH | AcOH | AcOH | AcOH | AcOH | AcOH |
| Volume of reaction mixture, ml | 13 | 15 | 20 | 10 | 6 | 2 | 2 | 2 | 2 | 4 | 8 | 12 | 16 |
| Reaction temp., °C | 23±2 | 23±2 | 23±2 | 23±2 | 23±2 | 23±2 | 23±2 | 0 | 0 | 23±2 | 23±2 | 23±2 | 23±2 |
| Reactants charged naphthalene: | | | | | | | | | | | | | |
| Weight, g | 0.480 | 0.800 | 0.522 | 0.800 | 0.160 | 0.160 | 0.160 | 0.150 | 0.160 | 0.137 | 0.137 | 0.137 | 0.137 |
| Mmol | 3.75 | 6.25 | 4.08 | 6.25 | 1.25 | 1.25 | 1.25 | 1.25 | 1.25 | 1.07 | 1.07 | 1.07 | 1.07 |
| Conc. in reaction mixture, M | 0.289 | 0.417 | 0.204 | 0.625 | 0.208 | 0.622 | 0.622 | 0.622 | 0.622 | 0.268 | 0.134 | 0.089 | 0.067 |
| MSP: | | | | | | | | | | | | | |
| Weight, g | 0.720 | 0.720 | 0.380 | 0.360 | 0.360 | 0.087 | 0.087 | 0.087 | 0.087 | 0.210 | 0.210 | 0.210 | 0.210 |
| Mmol | 3.79 | 3.79 | 2.00 | 1.89 | 1.89 | 0.46 | 0.46 | 0.46 | 0.46 | 1.10 | 1.10 | 1.10 | 1.10 |
| Conc. in reaction mixture, M | 0.292 | 0.256 | 0.100 | 0.189 | 0.315 | 0.230 | 0.230 | 0.230 | 0.230 | 0.276 | 0.138 | 0.092 | 0.069 |
| Mole ratio, naphthalene to MSP | 1.0 | 1.6 | 2.0 | 3.2 | 0.6 | 2.7 | 2.7 | 2.7 | 2.7 | 1.0 | 1.0 | 1.0 | 1.0 |
| Naphthalene after reaction: | | | | | | | | | | | | | |
| Weight, g | 0.052 | 0.300 | 0.362 | 0.500 | 0.039 | 0.048 | 0.048 | 0.048 | 0.048 | 0.032 | 0.032 | 0.034 | 0.032 |
| Mmol | 0.41 | 2.34 | 2.82 | 3.92 | 0.30 | 0.37 | 0.37 | 0.37 | 0.37 | 0.25 | 0.25 | 0.26 | 0.25 |
| Conversion of naphthalene, mol percent | 89 | 63 | 32 | 37 | 76 | 70 | 70 | 70 | 70 | 77 | 77 | 75 | 77 |
| α-Ester Formed: | | | | | | | | | | | | | |
| Weight, g | 0.411 | 0.503 | 0.370 | 0.375 | 0.174 | 0.080 | 0.080 | 0.064 | 0.066 | 0.123 | 0.130 | 0.136 | 0.148 |
| Mmol | 1.85 | 2.27 | 1.67 | 1.69 | 0.79 | 0.36 | 0.36 | 0.29 | 0.30 | 0.55 | 0.59 | 0.61 | 0.67 |
| α- +β-Ester formed: | | | | | | | | | | | | | |
| Weight, g | 0.458 | 0.555 | 0.410 | 0.420 | 0.392 | 0.089 | 0.089 | 0.069 | 0.071 | 0.131 | 0.140 | 0.148 | 0.165 |
| Mmol | 2.06 | 2.50 | 1.84 | 1.89 | 0.87 | 0.40 | 0.40 | 0.31 | 0.32 | 0.59 | 0.63 | 0.67 | 0.74 |
| Ratio of α- to β-ester | 8.8 | 9.9 | 9.8 | 8.5 | 9.9 | 9.0 | 9.0 | 14.0 | 15.0 | 14.0 | 15.0 | 10.0 | 9.6 |
| Efficiency, based on Napthalene to: | | | | | | | | | | | | | |
| α-Ester mol percent | 56 | 58 | 133 | 72 | 84 | 38 | 38 | 30 | 31 | 67 | 71 | 76 | 81 |
| α- +β-ester, mol percent | 62 | 64 | 148 | 80 | 97 | 42 | 42 | 33 | 34 | 72 | 77 | 83 | 91 |
| Yield, based on MSP, of: | | | | | | | | | | | | | |
| α-ester mol percent | 49 | 60 | 84 | 90 | 42 | 78 | 78 | 63 | 65 | 50 | 54 | 55 | 61 |
| α- +β-ester, mol percent | 56 | 66 | 92 | 100 | 46 | 87 | 87 | 67 | 70 | 54 | 57 | 61 | 67 |

The runs were carried out at atmospheric pressure and room temperature except runs 8 and 9 which were run at 0° C. The reaction time was 15 min. Abbreviations used; MSP, bis-(methanesulfonyl peroxide); α-ester, α-naphthyl methane-sulfonate; β-ester, β-naphthyl methanesulfonate.

The reactants were charged volumetrically using stock solutions in acetic acid. The weights charged are calculated from the analysis of each stock solution and the volume used. The MSP used to make the stock solution was 95% pure. The figures listed are the weights of 100% MSP.

As can be noted from the table above the yield efficiency of alpha and beta-naphthyl methanesulfonates based on bis-(methanesulfonyl peroxide) increased as the ratio of naphthalene to bis-(methanesulfonyl peroxide) was increased. For example, at a mole ratio of naphthalene to bis-(methanesulfonyl peroxide) of 3, the yield efficiency of total ester based on bis-(methanesulfonyl peroxide) was greater than 99 percent. (Run No. 4). As the molar ratio of naphthalene to bis-(methanesulfonyl peroxide) decreased to about 1, the yield efficiency of total ester based on bis-(methanesulfonyl peroxide) decreased to about 55 percent.

Runs Nos. 6, 7, 8, and 9 indicate the results of reactions carried out at room temperature (23° ± 2° C) and at 0° C. When the reaction was carried out at 0° C the yields of the esters based on bis-(methanesulfonyl peroxide) were lower than the yields obtained at room temperature, while the ratio of alpha-ester to beta-ester varied from 9 at room temperature to 15 at 0° C.

Table No. IV shows that the effect of the solvent, whether acetone or acetic acid, on the yield of esters based on bis-(methanesulfonyl peroxide) is negligible.

TABLE IV

| Run No. | Solvent | Naphthalene to MSP Ratio | Yield of α-Ester based on MSP | Yield of β-Ester based on MSP |
|---|---|---|---|---|
| 1 | Acetone | 0.9 | 54 | 62 |
| 2 | Acetone | 1.0 | 61 | 65 |
| 3 | AcOH | 1.0 | 49 | 56 |
| 4 | Acetone | 1.9 | 71 | 77 |
| 5 | Acetone | 2.0 | 68 | 74 |
| 6 | AcOH | 2.0 | 84 | 92 |

The runs were carried out at atmospheric pressure and room temperature. Bis-(methanesulfonyl peroxide) is abbreviated MSP in this table.

EXAMPLE III

Bis(methanesulfonyl peroxide) was prepared as described in Example I by the anodic oxidation of 10 M aqueous methanesulfonic acid. Runs were made in benzene solvent at atmospheric pressure at a temperature of 26° = 3° C with results described in Table V. As an example of how the process was carried out, in Run No. 2, 3.92 millimoles (0.502 grams) of naphthalene was dissolved in 0.33 moles (30 ml) of benzene. Solid bis-(methanesulfonyl peroxide) (3.70 millimoles) was added in small portions to the solution. The concentration of the reactants to the benzene solution was then approximately 3.13 molar. After ten minutes samples of the reaction were taken for analysis.

TABLE V

| Run Number | 1 | 2 | 3 |
|---|---|---|---|
| Reactants Charged | | | |
| Benzene: wt, g | 26.26 | 25.98 | 26.25 |
| vol, ml | 30 | 30 | 30 |
| Naphthalene: wt, g | 0.251 | 0.502 | 0.754 |
| mmol | 1.96 | 3.92 | 5.89 |
| MSP: wt, g | 0.365 | 0.702 | 1.090 |
| mmol | 1.91 | 3.70 | 5.74 |
| mol/liter | 0.064 | 0.0123 | 0.191 |
| Product Analysis | | | |
| PhMS: wt, g | 0.024 | 0.049 | 0.088 |
| mmol | 0.140 | 0.285 | 0.510 |
| α-Ester: wt, g | 0.300 | 0.600 | 0.940 |
| mmol | 1.35 | 2.70 | 4.24 |
| α- + β-Ester: wt, g | 0.327 | 0.656 | 1.096 |
| mmol | 1.47 | 2.95 | 4.94 |
| Ratio of α- + β-Ester to PhMS | 10.5 | 10.3 | 9.7 |
| Ratio of α- to β-Ester | 11.3 | 10.7 | 6.0 |
| Yield-Efficiency based on MSP: | | | |
| α-Ester, % | 71 | 73 | 74 |
| Total Esters, % | 84 | 88 | 95 |

Runs were carried out at atmospheric pressure and 26 ± 3°C. MSP was added as a solid to the naphthalene solution in benzene. The reaction time was 10 min. Abbreviations used: MSP, bis-(methanesulfonyl peroxide); PhMS, phenyl methanesulfonate; α-ester, α-naphthyl methanesulfonate; β-ester, β-naphthyl methanesulfonate; total esters, PhMS + β-ester + β-ester.

According to the results shown in Table V, when the reaction was carried out at a mole ratio of naphthalene to bis-(methanesulfonyl peroxide) of 1, the yield efficiency of esters based on bis-(methanesulfonyl peroxide) increased with the concentration of the reactant. At mole ratios of benzene to naphthalene of 166, 83, and 55 respectively, the yield efficiencies of the total esters including phenyl methanesulfonate based on bis-(methanesulfonyl peroxide) were 84, 88, and 95 mole percent. These results indicate that the reaction rate of bis-(methanesulfonyl peroxide) with naphthalene is sufficiently higher than the reaction rate of bis-(methanesulfonyl peroxide) with benzene to allow it to be useful as a solvent in the process of this invention. The use of benzene as a solvent also presents some advantages over other solvents in that the by-product formed by the oxidation of benzene with methanesulfonyl peroxide has economic value. The reaction can thus be carried out at a mole ratio of naphthalene to bis-(methanesulfonyl peroxide) of about 1 with a high yield of total esters. The benzene is converted to phenyl methanesulfonate which is readily hydrolyzed to phenol, a valuable chemical product.

EXAMPLE IV

A continuous reaction system for the oxidation of naphthalene with bis-(methanesulfonyl peroxide) to the corresponding alpha naphthyl ester was devised. A reaction flask (500 ml Morton flask) with a decantation chamber was attached to the electrolytic cell described in Example I. Aqueous methanesulfonic acid (10 M) was passed through the electrolytic cell where it was converted to a solution of methanesulfonic acid saturated with bis-(methanesulfonyl peroxide). This solution was then contacted with the immiscible organic phase (naphthalene and benzene) in a stirred reaction flask. In the decantation chamber the electrolytic solution was separated from the organic phase and recycled to the electrolytic cell. The results are shown in Table No. VI.

To obtain high yields in the continuous system all the organic compounds should be removed from the electrolytic solution before it is recycled to the electrolytic cell as the naphthyl esters formed by the reaction of naphthalene and bis-(methanesulfonyl peroxide) are further oxidized when allowed to come into contact with an excess of bis-(methanesulfonyl peroxide) in aqueous methanesulfonic acid.

TABLE VI

| Reactor Charge | 1(a) | 2(b) | 3(a) | 4(a) | 5(b) |
|---|---|---|---|---|---|
| Naphthalene solution | | | | | |
| Benzene: wt, g | 160 | 174 | 150 | 150 | 145 |
| Naphthalene: wt, g | 64 | 32 | 60 | 50 | 20 |
| mol | 0.50 | 0.25 | 0.47 | 0.39 | 0.15 |
| Methanesulfonic acid (c) | | | | | |
| MSA (10M): vol, ml | 330 | 120 | 268 | 290 | 210 |
| MSA: wt, g | 316 | 115 | 256 | 278 | 200 |
| mol | 3.3 | 1.2 | 2.7 | 2.9 | 2.1 |
| Results | | | | | |
| Naphthalene reacted, mole % of charge | 18 | 18 | 24 | 20 | 40 |
| Naphthyl esters, wt % in organic phase | <0.5 | 2.0 | <0.5 | <0.5 | 6.5 |
| Naphthyl esters, efficiency | <40 | 35 | <30 | <42 | 70 |

The runs were carried out at room temperature. Approximately 0.17 Faradays was passed in each run (0.8 amps, 6 hr).

(a)The naphthalene solution in benzene was placed in the reactor. When the electrolysis was started the electrolytic solution was recirculated with the aid of a bellows pump. The two phases in the reaction flask were mixed with strong agitation.

(b)The MSP was separated in the fritted glass filter, then the electrolytic solution was recirculated to the reaction flask with no current flowing through the cell.

(c)Abbreviations used: MSP, bis-(methanesulfonyl peroxide); MSA, methanesulfonic acid; naphthyl esters, α- and β-naphthyl methanesulfonates.

EXAMPLE V

Several batch runs were carried out using benzene as solvent for naphthalene and bis-(methanesulfonyl peroxide). The bis-(methanesulfonyl peroxide) was made by electrolysis of a 10 M aqueous solution of methanesulfonic acid as described in Example I. The results are shown in Table VII.

TABLE VII

| Run Number | 1 | 2(a) | 3(b) | 4(c) | 5(d) |
|---|---|---|---|---|---|
| Reactant Charged | | | | | |
| Benzene: wt, g | 26.16 | 26.23 | 26.19 | 42.5 | 43 |
| vol, ml | 30.0 | 30.0 | 30 | 50 | 50 |
| Naphthalene: wt, g | 0.513 | 0.514 | 0.503 | 0.900 | 0.780 |
| mmol | 4.0 | 4.0 | 3.93 | 7.00 | 6.10 |
| mol/l | 0.13 | 0.13 | 0.13 | 0.14 | 0.12 |
| MSP: wt, g | 0.761 | 0.754 | 0.765 | 1.300 | 1.280 |
| mmol | 4.00 | 4.00 | 4.00 | 6.85 | 6.75 |
| mol/l | 0.13 | 0.13 | 0.13 | 0.14 | 0.14 |
| Product Analysis | | | | | |
| PhMS: wt, g | 0.114 | 0.119 | 0.106 | 0.056 | 0.060 |
| mmol | 0.660 | 0.695 | 0.615 | 0.325 | 0.350 |
| α-Ester: wt, g | 0.660 | 0.582 | 0.62 | 0.98 | 0.94 |
| mmol | 2.98 | 2.63 | 2.77 | 4.41 | 4.23 |
| α+β-Ester: wt, g | 0.72 | 0.64 | 0.65 | 1.08 | 1.02 |
| mmol | 3.22 | 2.90 | 2.93 | 4.86 | 4.60 |
| Yield Efficiency based on MSP: | | | | | |
| α-Ester, % | 75 | 66 | 69 | 71 | 68 |
| Total Esters, % | 97 | 90 | 89 | 76 | 73 |

Runs were carried out at atmospheric pressure and room temperature (26 ± 3°C). Reaction time was 45 min. Abbreviations used: MSP, bis-(methanesulfonyl peroxide); PhMS, phenyl methanesulfonate; α-ester, α-naphthyl methanesulfonate; β-ester, β-naphthyl methanesulfonate; total esters, PhMS + α-ester + β-ester.

(a)The experiment was carried out in the presence of a water phase.
(b)The experiment was carried out in the presence of a 10M MSA phase.
(c)The experiment was carried out using a naphthalene in benzene solution saturated with water.
(d)The experiment was carried out using a naphthalene in benzene solution saturated with 10 M MSA.

EXAMPLE VI

Nitrobenzene was used as the solvent for the naphthalene and bis-(methanesulfonyl peroxide) reactants. No reaction of the nitrobenzene with the bis-(methanesulfonyl peroxide) was observed. Alpha-naphthyl methane methanesulfonate was obtained in a yield, based on bis-(methanesulfonyl peroxide) of 69 percent.

I claim:
1. A process for oxidizing naphthalene to form naphthyl methanesulfonates in a ratio of alpha-methanesulfonate to beta-methanesulfonate of at least about 8 to 1, said process comprising contacting naphthalene with bis(methanesulfonyl) peroxide at a molar ratio of naphthalene to bis(methanesulfonyl) peroxide of between about 0.5:1 and about 10:1 at a temperature of between about 0° C. and about 50° C. in a solvent selected from the group consisting of benzene, nitrobenzene, toluene, dioxane, acetic acid, and acetone, the concentration of naphthalene being between about 0.01 moles per liter and about 0.6 moles per liter.

2. A process according to claim 1 wherein:
the temperature is between about 15° C. and about 40° C.; and
the bis(methanesulfonyl)peroxide is employed in a concentration of between about 0.05 moles per liter and about 0.2 moles per liter.

* * * * *